United States Patent [19]

Strattan et al.

[11] Patent Number: 5,133,515
[45] Date of Patent: Jul. 28, 1992

[54] PITCH STABILIZATION SYSTEM FOR AN EJECTION SEAT

[75] Inventors: Washington A. Strattan, Yorba Linda; Alexander B. McDonald, Long Beach; Robert B. Calkins, Huntington Beach, all of Calif.

[73] Assignee: McDonnell Douglas Corporation, Long Beach, Calif.

[21] Appl. No.: 643,359

[22] Filed: Jan. 22, 1991

[51] Int. Cl.⁵ .......................................... B64D 25/112
[52] U.S. Cl. ............................ 244/122 AB; 244/122 A
[58] Field of Search ......... 244/122 A, 122 AB, 122 AE, 244/122 AG, 122 AH, 122 R

[56] References Cited

FOREIGN PATENT DOCUMENTS 700828 12/1964 Canada ......................... 244/122 AE Primary Examiner—Joseph F. Peters, Jr.
Assistant Examiner—Carla Mattix
Attorney, Agent, or Firm—Donald E. Stout; Gregory A. Cone; John P. Scholl

[57] ABSTRACT

A pitch stabilization system for an ejection seat includes a gyroscope rotor assembly having a pinion gear attached to two rotor wheels. The rotor assembly is mounted with a geometry to precess in response to change in the pitch rate of the seat. Precession of the gyro rotor rotates a vernier rocket with the resulting thrust applying a correcting moment to counter the adverse moment causing the ejection seat to pitch. When the seat is at rest in the cockpit of the aircraft, the rotor pinion gear teeth engage the teeth of a rack mounted stationarily to a fixed attach point on the aircraft. When an ejection force is applied to the seat, by a catapult or the like, the rotor wheel is rotated by virtue of the interengaging relationship between the rotor pinion gear teeth and the rack teeth so that by the time the ejection seat exits the cockpit the rotor disengages from the upper end of the rack, and is fully spun to operating revolution so that it can precess gyroscopically. Thus, the pitch stabilization system is actuated merely by the seat ejection force rather than by some additional actuation force. The vernier rocket is ignited during ejection as part of the ejection seat sequencing system.

15 Claims, 2 Drawing Sheets

PITCH STABILIZATION SYSTEM FOR AN EJECTION SEAT

BACKGROUND OF THE INVENTION

When a vehicle is launched from a stationary launch platform and begins its launch trajectory, one of the most important considerations is to ensure that the vehicle does not rotate excessively about its lateral (pitch) axis. In other words, it is essential to stabilize the pitch of the vehicle. Thus, all launch vehicles are equipped with some type of pitch stabilization system. This is true for ejection seats as well as for other vehicles such as missiles and spacecraft. When an ejection seat is ejected from the aircraft cockpit by a catapult or other equivalent means, the windblast effect will push the top of the seat aft of the vehicle while the bottom of the seat is still constrained by the guide rails, producing a rotational moment on the seat and causing an undesirable aft pitch angle. To counter that tendency, the typical prior art pitch stabilizer consists of a gyroscope rotor which precesses in response to a change in pitch of the seat. This rotor is linked by some interconnection means with a stabilization thruster, which rotates in response to the precession of the gyro rotor. The change in thruster nozzle direction provides a counter-thrust to the pitch force and acts to stabilize the pitch of the seat. This system is very effective for its intended purpose.

The problem is that for the above system to work, the gyro rotor must be spun up to a speed sufficient for it to accurately sense pitch rate and precess accordingly, so that the thruster is rotated to counter the change in pitch. The problem of pitch change will be the most severe immediately after the cockpit breakaway point, so the gyro must be fully operational at that time. Since the rotor will be at rest until seat ejection occurs, the process of spinning up the rotor to operating speed must occur very rapidly, being accomplished prior to the time when the seat fully breaks away from the cockpit.

In prior art systems, the gyro rotor has been spun up using some type of on-board actuator. Most typically, this comprises an initiator charge, which is activated at the start of the ejection sequence. In one particular prior art system, the initiator is mounted on the seat and the gyro rotor is a toothed rotor, intermeshingly engaged with a toothed rack, also mounted on the seat. When the initiator is actuated, the rack is driven along the gyro rotor, the toothed interface acting to rotate the rotor. By the time the gyro rotor is disengaged from the end of the rack, it is at operating speed. One problem with a system such as this one is its weight. In an aircraft environment, each additional pound exacts a penalty in fuel cost and performance and the weight of the additional actuator is a consideration. Furthermore, it creates another complexity in the ejection sequence. Should the initiator fail, and the gyro rotor not be spun up to operating speed, the pitch stabilizer will be non-operational and the ensuing ejection could well be catastrophic to the seat occupant. What is needed is a simple, mechanically reliable, lightweight actuation system for ensuring that the gyro rotor is operational every time it is necessary to eject.

SUMMARY OF THE INVENTION

This invention solves the problem outlined above by utilizing a simple mechanical system for spinning up the gyro rotor of a pitch stabilization system. A gyroscopic rotor assembly includes a small pinion gear attached to two larger rotor wheels. The pinion gear is toothed about its circumference and the gyro rotor assembly is mounted with a geometry to precess in response to rotation of the ejection seat about its pitch axis when it is spinning at operating speed. A rack is mounted to a fixed attach point in the cockpit of the aircraft so that it remains in the aircraft following seat ejection, and is toothed along one edge, the teeth interengaging with those of the pinion gear when the seat is anchored in the cockpit. A stabilization thruster is mounted on the seat, and is interconnected with the gyro rotor so that when the gyro rotor precesses in response to a pitch change of the seat, the thruster rotates about its lateral axis, which is parallel to the seat pitch axis, to apply a correcting moment to the seat. The rotor assembly is spun up to operating speed as it travels along the stationary rack during ejection of the seat from the cockpit. The intermeshing engagement of the toothed pinion gear and the toothed rack as the rotor assembly travels up the rack causes the pinion gear to spin very rapidly, since the rotor assembly is traveling along the rack at ejection speed. By the time the rotor assembly disengages from the rack as the seat exits the aircraft, the rotor wheel is spinning at operating speed.

Therefore, it is an object of this invention to provide a mechanically simple method and apparatus for spinning up the gyro rotor assembly of a pitch stabilization system.

It is also an object of this invention to provide a very reliable method and apparatus for ensuring that the pitch stabilization system is operational every time it is required.

It is also an object of this invention to eliminate the need to utilize an additional actuator to spin up the gyro rotor assembly of a pitch stabilization system, by using the launching force of the launch vehicle to perform the spin-up operation.

The above mentioned and other objects and features of this invention and the manner of attaining them will become apparent, and the invention itself will be best understood, by reference to the following description taken in conjunction with the accompanying illustrative drawings.

DETAILED DESCRIPTION OF THE DRAWINGS

Figure 1:
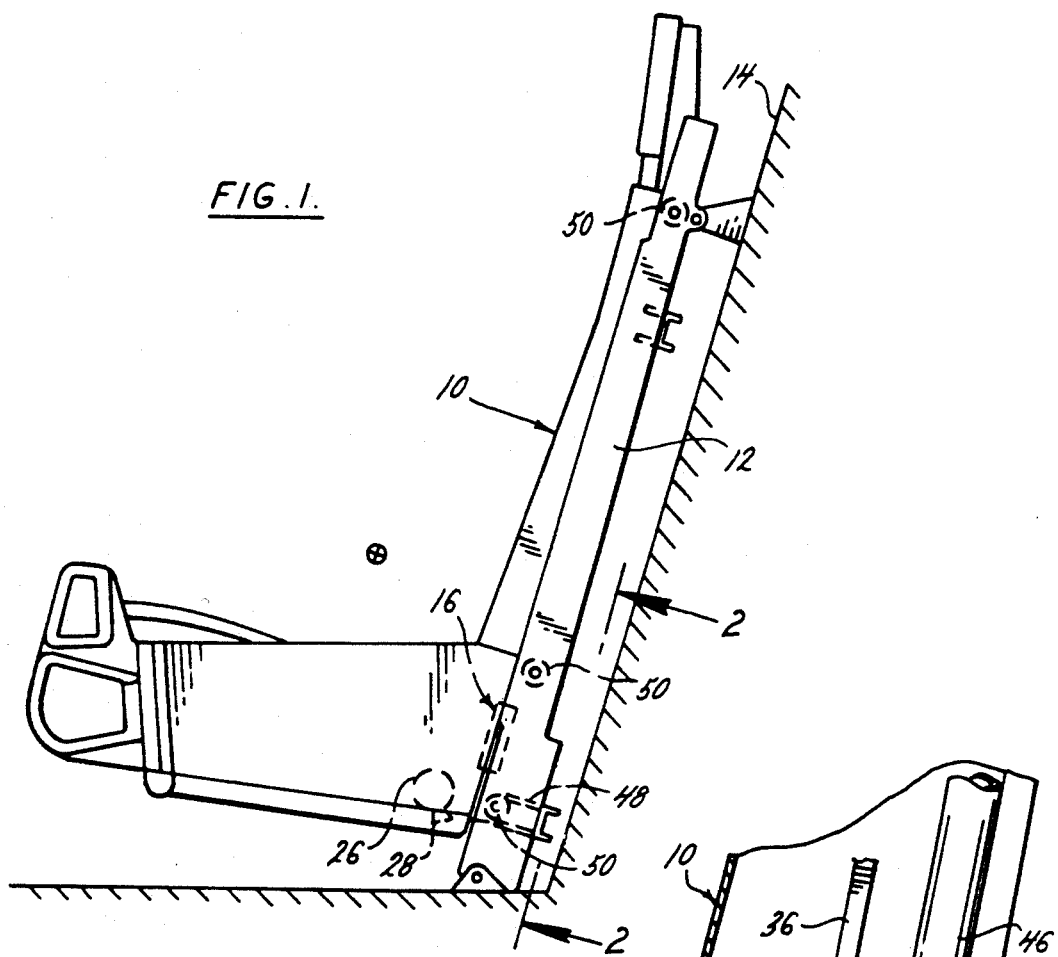
FIG. 1 is an elevational view of an ejection seat mounted in a cockpit.
Figure 4:
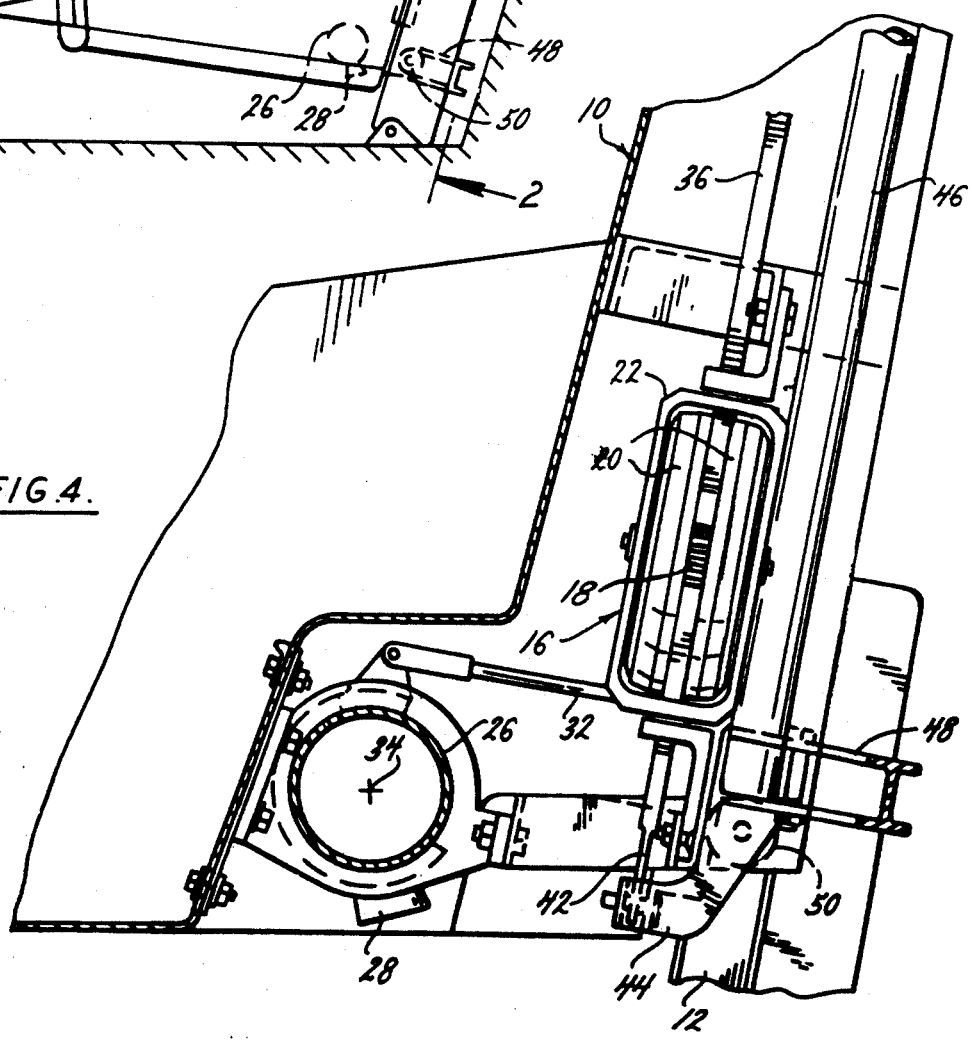
FIG. 4 is a cross-sectional view along line 4—4 of FIG. 2.
Figure 2:
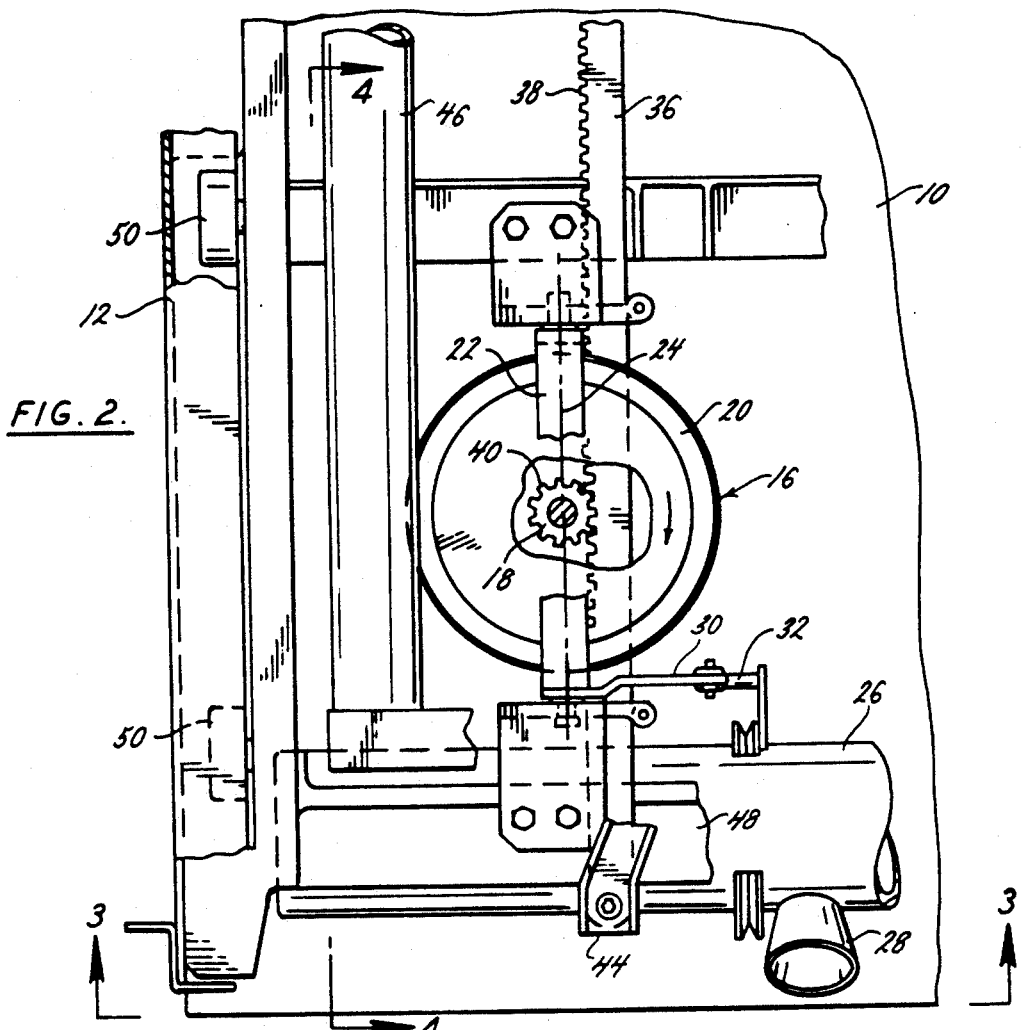
FIG. 2 is a cross-sectional view along line 2—2 of FIG. 1, showing the pitch stabilization system of the invention.
Figure 3:
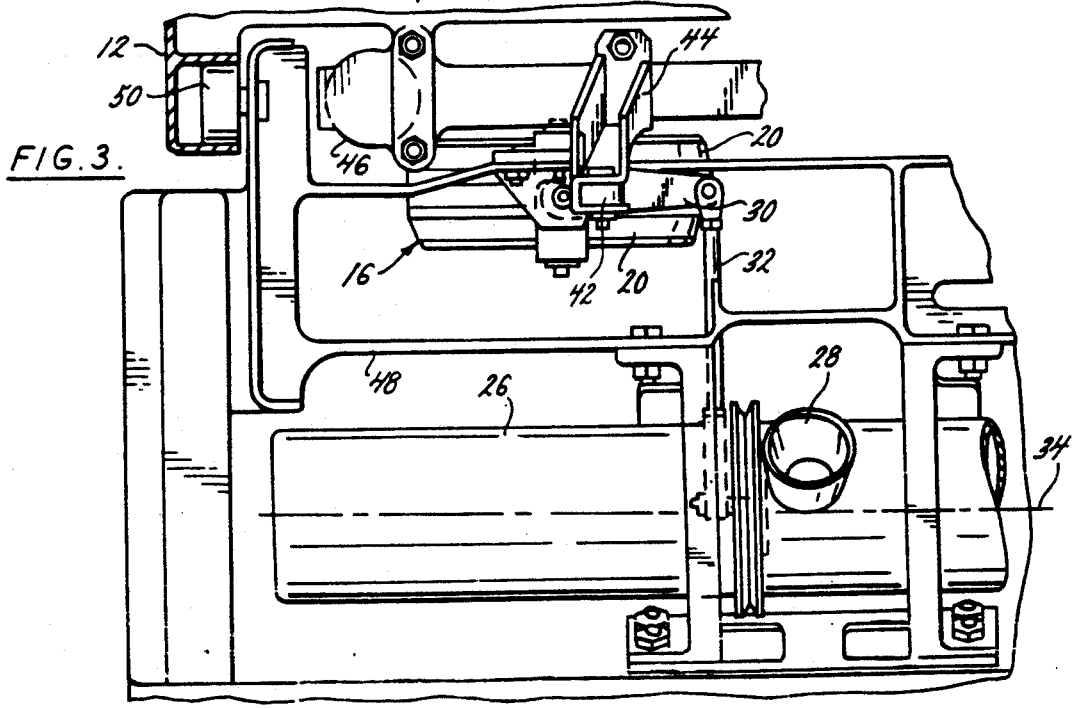
FIG. 3 is a cross-sectional view along line 3—3 of FIG. 2.

Referring now to FIG. 1, there is shown an ejection seat 10 installed on guide rails 12 and mounted on a fixed cockpit 14. Viewing FIGS. 2-4, gyroscopic rotor assembly 16 comprises a small pinion gear 18 attached to two larger rotor wheels 20 in such a manner as to be sandwiched between them. The rotor assembly 16 is mounted on a gimbal 22 and installed in a well known geometry and manner such that it precesses and rotates about the gimbal axis 24 in response to a change in pitch of the seat. Vernier rocket 26 and nozzle 28 are operationally connected through mechanical links 30 and 32 so that when rotor assembly 16 precesses, the vernier rocket 26 is driven to rotate about its lateral axis 34. Long gear tooth rack 36 is mounted vertically such that its teeth 38 engage with pinion gear teeth 40. The lower end 42 of the rack 36 is attached to the base 44 of an ejection twin tube catapult 46. The upper end of the twin tube catapult 46 is fastened to the seat 10.

In operation, during normal flight conditions the seat 10 remains firmly attached to the catapult 46 by means of a guide rail carriage assembly 48. The guide rails 12 are fastened to the cockpit 14. The guide rail carriage assembly 48 allows the seat 10 and ejection catapult 46 to adjust vertically for proper flight position without precessing the gyroscopic rotor assembly 16, as the rack and seat move together. Guide rollers 50, mounted on each side of the seat, allow for vertical travel along the guide rails 12. When ejection is initiated, a signal initiates the catapult, which launches the seat 10 upwardly along the guide rails. During the catapult power stroke, the seat is accelerated to 32 feet per second velocity. As the seat travels upwardly, the rotor, travelling with the seat, is spun by the intermeshing relationship of the pinion gear 18 with the stationary rack 36. By the time the rotor 20 exits the top of the rack 36 as the seat 10 exits the top of the guide rails 12, it is spun up to gyro operating speed of a minimum 9000 revolutions per minute. As the rack 36 disengages from the pinion gear 18, the rotor assembly 16 is uncaged, allowing it to precess about the gimbal axis 24. As part of the seat ejection initiation system, the vernier rocket 26 is ignited at a predetermined time as the seat 10 travels up the guide rails 12. As the gyroscopic rotor assembly 16 precesses about the gimbal axis 24 in reaction to pitching moments on the seat 10, the vernier rocket 26 and nozzle 28 are actuated through the mechanical linkages 30 and 32, thereby positioning the thrust to provide a correcting moment to counteract the seat pitching moment.

Although an exemplary embodiment of the invention has been shown and described, many changes, modifications, and substitutions may be made by one having ordinary skill in the art without departing from the spirit and scope of the invention. For example, although a mechanical interconnection is shown for rotating the vernier rocket 26 by means of the gyro rotor assembly 16, another type of well known drive linkage, such as a cable and pulley system, could easily be employed instead. Additionally, although a twin tube catapult 46 is disclosed for ejecting the seat 10 from the cockpit 14, any other known system for launching an ejection seat could be substituted. Most fundamentally, this invention is applicable to any launch vehicle which requires pitch stabilization, and is not to be construed as limited to the ejection seat field, but should only be limited as defined in the following claims.

We claim:

1. A pitch stabilizer for a vehicle which is adapted for launching from a launch platform, comprising:
   a gyroscopic rotor assembly including a gear having teeth about its circumference, said rotor assembly being gimballed to sense pitch rate of said vehicle when said rotor assembly is spinning at operating speed;
   a rack means having a plurality of teeth along one edge, said rack means being mounted from said launch platform and being stationary with respect thereto, said rack means teeth being in an interengaging relationship with said rotor assembly gear teeth when said launch vehicle is at rest on said launch platform;
   said vehicle having a pitch axis;
   a stabilization thrust producing means mounted on said vehicle, said thrust producing means being interconnected with said rotor assembly such that when said rotor assembly precesses in response to a rotation of said vehicle about said pitch axis, said thrust producing means rotates to apply a correcting moment to said vehicle;
   said rotor assembly being rotated by said interengaging relationship between said gear teeth and said rack means teeth as said launch vehicle travels away from said launch platform when a launch force is applied to said vehicle, such that said rotor assembly is spun up to operating speed by the time it disengages from the top of said rack means as the vehicle is launched.

2. The pitch stabilizer of claim 1, wherein said stabilization thrust producing means has a lateral axis parallel to said vehicle pitch axis, said thrust producing means rotating about said lateral axis in response to a rotation of said vehicle about said pitch axis to apply a correcting moment to said vehicle.

3. The pitch stabilizer of claim 1 wherein said stabilization thrust producing means comprises a vernier rocket having a thrust nozzle.

4. The pitch stabilizer of claim 3, wherein mechanical links interconnect said gyroscopic rotor assembly and said vernier rocket.

5. The pitch stabilizer of claim 1 wherein said gyroscopic rotor assembly further comprises at least one rotor wheel, said rotor wheel being attached to said gear.

6. The pitch stabilizer of claim 5 wherein said gear is a pinion gear, said gyroscopic rotor assembly comprising two rotor wheels, said pinion gear being smaller than said two rotor wheels and being attached to both rotor wheels in such a manner as to be sandwiched between them.

7. The pitch stabilizer of claim 1 wherein said vehicle comprises an ejection seat.

8. The pitch stabilizer of claim 7, wherein said launch force is applied by a catapult means.

9. An ejection seat system for an aircraft, comprising:
   a cockpit;
   an ejection seat removably mounted to said cockpit and capable of ejection therefrom, said ejection seat having a pitch axis;
   a catapult means for providing an ejection force to said seat;
   said seat having a pitch stabilization means, said pitch stabilization means including:
   a gyroscopic rotor assembly including a gear having teeth about its circumference, said rotor assembly being gimballed to sense a rotation of said ejection seat about said pitch axis;
   a rack means having a plurality of teeth along one edge, said rack means being mounted to said cockpit and being stationary with respect thereto, said rack means teeth being in an interengaging relationship with said gear teeth when said ejection seat is mounted to said cockpit;
   a stabilization thrust producing means mounted on said ejection seat, said thrust producing means being interconnected with said rotor assembly such that when said rotor assembly precesses in response to a rotation of said ejection seat about said pitch axis, said thrust producing means rotates to apply a correcting moment to said ejection seat;

said rotor assembly being rotated by said interengaging relationship between said gear teeth and said rack means teeth as said ejection seat travels away from said cockpit when said catapult applies a launch force to said ejection seat, such that said rotor assembly is spun up to operating speed when it disengages from the top of said rack means as said ejection seat is launched.

10. The pitch stabilizer of claim 9, wherein said stabilization thrust producing means has a lateral axis parallel to said ejection seat pitch axis, said thrust producing means rotating about said lateral axis in response to a rotation of said ejection seat about said pitch axis to apply a correcting moment to said seat.

11. The ejection seat system of claim 9, wherein said stabilization thrust producing means comprises a vernier rocket having a thrust nozzle.

12. The ejection seat system of claim 11, wherein mechanical links interconnect said gyroscopic rotor assembly and said vernier rocket.

13. The ejection seat system of claim 9, wherein said gyroscopic rotor assembly further comprises at least one rotor wheel, said rotor wheel being attached to said gear.

14. The ejection seat system of claim 13, wherein said gear is a pinion gear, said gyroscopic rotor assembly comprising two rotor wheels, said pinion gear being smaller than said two rotor wheels and being attached to both rotor wheels in such a manner as to be sandwiched between them.

15. A method of stabilizing the pitch of a vehicle adapted for launching from a launch platform, comprising the steps of:

attaching a gyroscopic rotor assembly to said vehicle, said rotor assembly including a gear having teeth about its circumference;

gimballing said rotor assembly to sense a rotation of said vehicle about its pitch axis when said rotor assembly is spinning at operating speed;

mounting a rack means having a plurality of teeth along one edge to said launch platform;

interengaging said gear teeth and said rack teeth when said vehicle is at rest on said platform;

mounting a stabilization thrust producing means on said vehicle, said thrust producing means having a lateral axis which is parallel to said vehicle pitch axis;

interconnecting said thrust producing means and said rotor assembly such that when said rotor assembly precesses in response to a rotation of said vehicle about its pitch axis, said thrust producing means rotates about its lateral axis to apply a correcting moment to said vehicle;

applying a launching force to said vehicle, and;

spinning said rotor assembly up to operating speed by means of its motion relative to said rack as said vehicle separates from said launch platform.

* * * * *